(12) United States Patent
Kurtis et al.

(10) Patent No.: US 12,143,374 B2
(45) Date of Patent: Nov. 12, 2024

(54) SECURE COMMUNICATION BETWEEN DEVICES

(71) Applicant: BAE Systems plc, London (GB)

(72) Inventors: Ashley Kurtis, Warton (GB); Kristian Daniel, Warton (GB)

(73) Assignee: BAE Systems plc, London (GB)

( * ) Notice: Subject to any disclaimer, the term of this patent is extended or adjusted under 35 U.S.C. 154(b) by 220 days.

(21) Appl. No.: 17/765,305

(22) PCT Filed: Oct. 22, 2020

(86) PCT No.: PCT/GB2020/052651
§ 371 (c)(1),
(2) Date: Mar. 30, 2022

(87) PCT Pub. No.: WO2021/079115
PCT Pub. Date: Apr. 29, 2021

(65) Prior Publication Data
US 2022/0377058 A1    Nov. 24, 2022

(30) Foreign Application Priority Data

Oct. 23, 2019  (EP) ..................................... 19275105
Oct. 23, 2019  (GB) ..................................... 1915313

(51) Int. Cl.
*H04L 9/08*    (2006.01)
*H04L 9/14*    (2006.01)
(Continued)

(52) U.S. Cl.
CPC ........ *H04L 63/0485* (2013.01); *H04L 9/0819* (2013.01); *H04L 9/0866* (2013.01);
(Continued)

(58) Field of Classification Search
CPC ..... H04L 63/06; H04L 63/061; H04L 63/062; H04L 63/04; H04L 63/0428;
(Continued)

(56) References Cited

U.S. PATENT DOCUMENTS 10,798,090 B2 *  10/2020  Ogawa ................. H04L 63/083
2004/0034776 A1 *  2/2004  Fernando ............... H04L 9/321
                                                                713/171
(Continued)

FOREIGN PATENT DOCUMENTS

WO         2016126296 A1      8/2016

OTHER PUBLICATIONS

PCT International Search Report and Written Opinion of PCT Application No. PCT/GB2020/052651, mail date Jan. 20, 2021, 16 pages.
(Continued)

*Primary Examiner* — Shaqueal D Wade-Wright
(74) *Attorney, Agent, or Firm* — Maine Cernota & Curran

(57) ABSTRACT

A method of providing secure communication between first and second devices comprises the first device and the second device connecting to a server via a secure communication channel. Encryption keys for the devices are generated and data relating to the encryption keys are exchanged via the server in the secure communication channel. A peer-to-peer connection for exchanging data is generated using encrypted connection information for the devices.

17 Claims, 2 Drawing Sheets

(51) Int. Cl.
*H04L 9/40* (2022.01)
*H04L 67/104* (2022.01)

(52) U.S. Cl.
CPC ............ *H04L 9/14* (2013.01); *H04L 63/0428* (2013.01); *H04L 63/06* (2013.01); *H04L 67/104* (2013.01); *H04L 9/0861* (2013.01)

(58) Field of Classification Search
CPC . H04L 63/0485; H04L 63/08; H04L 63/0838; H04L 63/0819; H04L 63/0866; H04L 63/0861; H04W 12/04; H04W 12/041; H04W 12/0431; H04W 12/0471
See application file for complete search history.

(56) References Cited

U.S. PATENT DOCUMENTS

| | | | | |
|---|---|---|---|---|
| 2005/0076216 | A1* | 4/2005 | Nyberg | H04L 63/061 |
| | | | | 713/168 |
| 2016/0149899 | A1* | 5/2016 | Abbott | H04L 63/062 |
| | | | | 713/171 |
| 2017/0331793 | A1 | 11/2017 | Beltran et al. | |
| 2018/0167410 | A1* | 6/2018 | Johns | H04L 63/1466 |
| 2021/0352746 | A1* | 11/2021 | Zhou | H04W 12/033 |

OTHER PUBLICATIONS

Jennings D Wing Cisco Systems C: "SIP Offer/Anwser with Multipart Alternative; draft-jennings-sipping-multipart-01.txt", SIP Offer/Answer with Multipart Alternative; Draft-Jennings-Sipping-Multipart-01.txt, Internet Engineering Task Force, IETF, Standardworkingdraft, Internet Society (ISOC) 4, Rue des Falaises CH—1205 Geneva, Switzerland, No. 1, Jul. 10, 2005 (Jul. 10, 2005), XP015040576, section 5.
Alan B Johnston et al: "WebRTC: APIs and RTCWEB Protocols of the HTML5 Real-Time Web", Jun. 1, 2013 (Jun. 1, 2013), pp. 1-254, XP055316491, ISBN: 978-0-9859788-5-3. Retreived from the Internet: URL: http://www.docfoc.com/webrtc-apis-and-rtcweb-protocols-of-the-html5-real-time-web-second-editionpdf [retreived on Nov. 4, 2016].
Boldt Dennis et al: "Security Mechanisms for Signaling in WebRTC-Based Peer-to-Peer Networks", 2017 International Conference on Computational Science and Computational Intelligence (CSCI), IEEE, Dec. 14, 2017 (Dec. 14, 2017), pp. 19-24, XP033467322, DOI: 10.1109/CSCI.2017.4 [retreived on Dec. 4, 2018].
Rescorla RTMF E et al "WebRTC Security Architecture; draft-ietf-rtcweb-security-arch-20.txt", WebRTC Security Archetecture; Draft-IETF-RTCWEB-Security-Arch-20.txt; Internet-Draft: RTCWEB, Internet Engineering Task Force, IETF; StandardWorkingDraft, Internat Society (ISOC) 4 Rue des Falaises C, No. 20. Jul. 20, 2019 (Jul. 22, 2019), pp. 1-43, XP015134398, Retrieved from the Internet: URL: https://tools.ietf.org/html/draft-ietf-rtcweb-security-arch-20 [retreived on Jul. 22, 2019].
Great Britain Search Report Application No. GB1915313.9, mail date Jul. 7, 2020, 4 pages.
ZRTP: Media Path Key Agreement for Unicast Secure RTP, 2016, Zimmermann Silent Circle A Johnston P et al, "ZRTP: Media Path Key Agreement for Unicast Secure RTP; draft-zimmermann-rfc6189bis-00.txt" pp. 1-26.
European Search Report Application No. 19275105.5, mail date Mar. 4, 2020, 10 pages.
International Preliminary Report on Patentability for PCT Appl. No. PCT/GB2020/052651 mail date May 5, 2022, 10 pages.

* cited by examiner

SECURE COMMUNICATION BETWEEN DEVICES

RELATED APPLICATIONS

This application is a national phase application filed under 35 USC § 371 of PCT Application No. PCT/GB2020/052651 with an International filing date of Oct. 22, 2020, which claims priority of GB Patent Application 1915313.9 filed Oct. 23, 2019 and EP patent application Ser. No. 19/275,105.5 filed Oct. 23, 2019. Each of these applications is herein incorporated by reference in its entirety for all purposes.

FIELD OF THE INVENTION

The present invention relates to secure communication between devices.

BACKGROUND OF THE INVENTION

Secure data transfer is important in many situations. For example, there are currently no known video calling applications which provide a high standard of security for streaming sensitive data from one user to another. At this point in time some companies provide secure video calling, which is facilitated via their own cloud technology. However, for users of sensitive information, such as the military, there is a concern that a third party could potentially access that data when a call is taking place.

SUMMARY OF THE INVENTION

Embodiments of the present invention are intended to address at least some of the above technical problems.

Embodiments can allow users to securely exchange data, including making video calls, between devices (e.g. wearable devices and PCs), regardless of where they are in the world. The communication can take place peer-to-peer via a secure communication channel that is encrypted at either end.

According to an aspect of the present invention there is provided a (computer-implemented) method of providing secure communication between first and second devices, the method comprising:
the first device and the second device connecting to a server via a secure communication channel;
generating (e.g. by the first device or the server) encryption keys for the first device;
generating (e.g. by the second device or the server) encryption keys for the second device;
transferring (e.g. from the first device or the server) data relating to the encryption keys (e.g. a first public key) for the first device to the second device via the server in the secure communication channel;
transferring (e.g. from the second device or the server) data relating to the encryption keys (e.g. a second public key) for the second device to the first device via the server in the secure communication channel;
generating (e.g. by the first device or the server) peer-to-peer connection information for the first device and encrypting the peer-to-peer connection information for the first device using the data relating to the encryption keys for the second device;
generating (e.g. by the second device or the server) peer-to-peer connection information for the second device and encrypting the peer-to-peer connection information for the second device using the data relating to the encryption keys for the first device;
transferring (e.g. from the first device or the server) the encrypted peer-to-peer connection information for the first device to the second device via the server in the secure communication channel;
transferring (e.g. from the second device or the server) the encrypted peer-to-peer connection information for the second device to the first device via the server in the secure communication channel;
the first device decrypting the encrypted peer-to-peer connection information for the second device (e.g. using the public key for the first/second device);
the second device decrypting the encrypted peer-to-peer connection information for the first device (e.g. using the public key for the second/first device);
the first device and the second device using the decrypted peer-to-peer connection information for the first device and the decrypted peer-to-peer connection information for the second device to open a peer-to-peer connection in the secure communication channel, and
the first device and the second device exchanging data via the peer-to-peer connection.

The method may further comprise:
the first/second device including a security code in data transferred to the second/first device (via the server in the secure communication channel and/or via the peer-to-peer connection), and
the first/second device checking for inclusion of the security code in the data and only preforming further steps on the data if the security code is included in the data.

The security code may be included in the data relating to the encryption keys for the first or second, respectively, device; the encrypted peer-to-peer connection information for the first or second device, and/or the data exchanged with the first or second device via the peer-to-peer connection. For example, the first/second device may add the security code, e.g. a byte (a few digits), to a beginning and/or an end of the data, which may be used for generating the public key for the first/second device. The data may then only be able to be encrypted/decrypted if it includes the security code. The security code could be a known secret between users of the first device and the second device which only they know when making a call.

The method may further comprise:
deleting the encryption keys for the first device and/or the encryption keys for the second device after the exchanging of data has ended.

The encryption keys (for each of the first device and the second device) may comprise a public key and a private key. The transferred data relating to the encryption keys for the first or the second device may comprise the public key for the first or second device, respectively.

The peer connection information for the first/second device may comprise Session Description Protocol, SDP, information and may further comprise Interactive Connectivity Establishment, ICE, information. Embodiments may transfer the SDP then the ICE information in sequence between the first/second devices.

The method may further comprise: the server notifying, via the secure communication channel, the second device of the first device requesting to communicate with the second device, and
the server notifying the first device of acceptance of the communication request by the second device via the secure communication channel.

The secure communication channel may be implemented using a high threat gateway component. The secure communication channel may be implemented using a cloud computing service.

The exchanged data may comprise audio and/or video data and/or instant messaging data. The exchanged data may comprise an audio or video call data.

According to a further aspect of the invention there is provided a method for a first device to perform secure communication with a second device, the method comprising:
  connecting to a server via a secure communication channel;
  generating encryption keys for the first device;
  transferring data relating to the encryption keys for the first device to the second device via the server in the secure communication channel;
  receiving data relating to encryption keys for the second device via the server in the secure communication channel;
  generating peer-to-peer connection information for the first device and encrypting the peer-to-peer connection information for the first device using the data relating to the encryption keys for the second device;
  transferring the encrypted peer-to-peer connection information for the first device to the second device via the server in the secure communication channel;
  receiving encrypted peer-to-peer connection information for the second device via the server in the secure communication channel;
  decrypting the encrypted peer-to-peer connection information for the second device using the encryption keys for the first device;
  using the peer-to-peer connection information for the first device and the decrypted peer-to-peer connection information for the second device to open a peer-to-peer connection in the secure communication channel, and
  exchanging data with second device via the peer-to-peer connection.

According to a further aspect of the invention there is provided a method for a sever to allow a first device and a second device to perform secure communication, the method comprising:
  connecting to the first device via a secure communication channel;
  connecting to the second device via the secure communication channel;
  receiving data relating to encryption keys for the first device via the secure communication channel;
  receiving data relating to encryption keys for the second device via the secure communication channel;
  transferring the data relating to encryption keys for the first device to the second device via the secure communication channel;
  transferring the data relating to encryption keys for the second device to the first device via the secure communication channel;
  receiving encrypted peer-to-peer connection information for the first device and transferring the encrypted peer-to-peer connection information for the first device via the secure communication channel to the second device, and
  receiving encrypted peer-to-peer connection information for the second device and transferring the encrypted peer-to-peer connection information for the second device via the secure communication channel to the first device.

According to a further aspect of the present invention there is provided a computer-readable storage medium comprising instructions which, when executed by a computer, cause the computer to perform at least one of the methods described herein. The method may comprise the method performed by the first/second device. The method may comprise the method performed by the server.

According to another aspect of the present invention there is provided a data transfer server comprising a processor configured to perform a method of allowing a first device and a second device to perform secure communication substantially as described herein.

According to another aspect of the present invention there is provided a device comprising a processor configured to perform a method of performing secure communication with a second device substantially as described herein.

According to another aspect of the present invention there is provided a system adapted/configured to provide secure communication between first and second devices, the system comprising a server and at least the first device and the second device configured substantially as described herein.

The system may further comprise secure communication channel hardware.

BRIEF DESCRIPTION OF THE FIGURES

For a better understanding of the invention, and to show how embodiments of the same may be carried into effect, reference will now be made, by way of example, to the accompanying diagrammatic drawings in which.

DETAILED DESCRIPTION OF EMBODIMENTS

Figure 1:
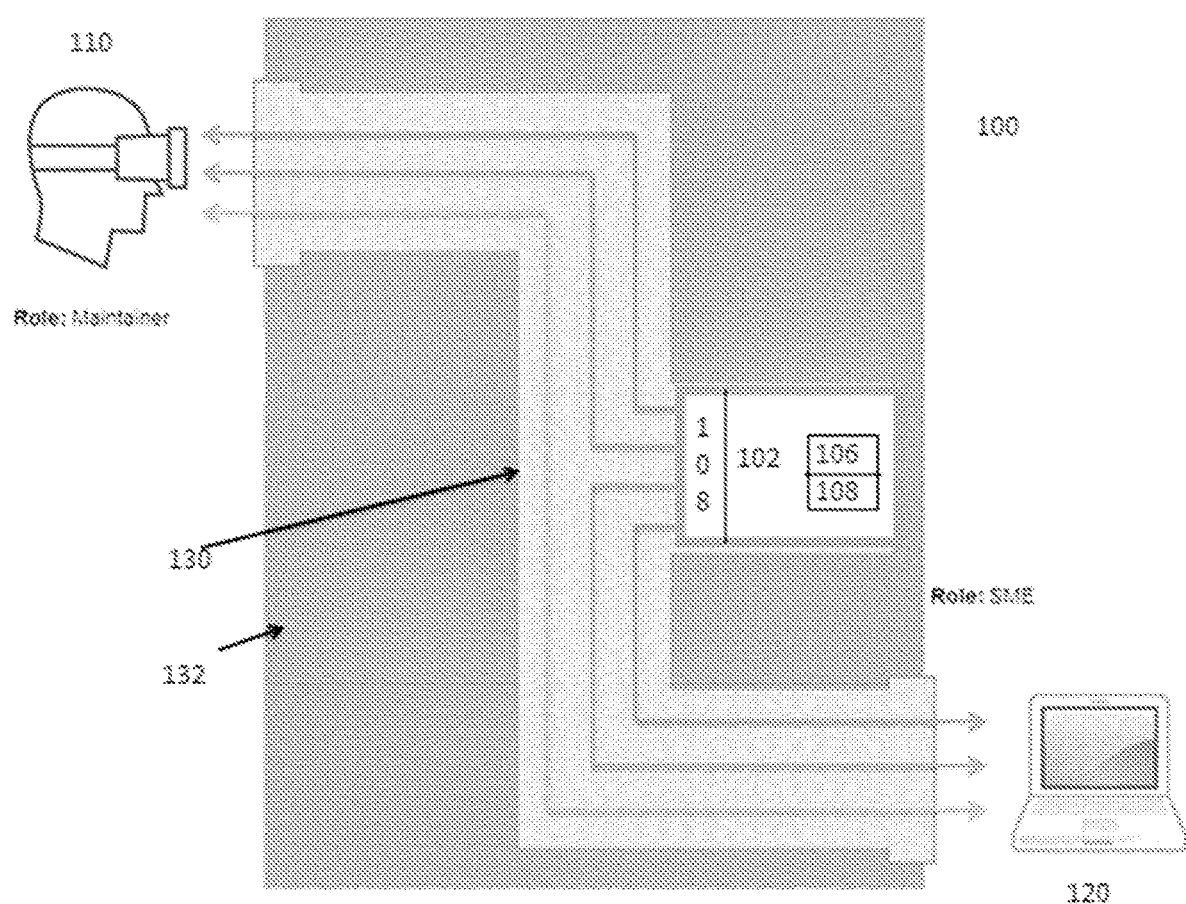
FIG. 1 is a block diagram of an example system.

FIG. 1 is a diagram of an example embodiment of a secure communication system 100. The example system comprises a server computing device 102 that has (or is in communication with) at least a memory 104 and a processor 106. The server may comprise a commercially-available Personal Computer (PC), a server rack or the like. The memory can contain data and instructions for processing/execution by the processor. The server can further comprise (or be in communication with) one or more wired or wireless communications interface 108. The server may also comprise (or be in communication with) further well-known features, such as a user interface, display, and so on, which need not be described herein in detail.

The example system 100 further comprises first and second devices. These may comprise various types of computing devices, e.g. a PC, smartphone, tablet, wearable device, etc. Each device will comprise (or be in communication with) at least a processor, memory and communications interface. In embodiments the first 110 and second 120 device are configured to exchange data by means of a secure communication channel 130 that can be controlled by the server 102.

In some embodiments the secure communication channel 130 may take the form of a secure pipeline, which may be implemented using high threat gateway hardware, such as Microsoft Forefront Threat Management Gateway™. The secure communication channel may comprise a communication channel that is dedicated to transferring data by embodiments and which may not be used for transferring other data. The transferred data in the channel may be encrypted using the techniques described herein. Data within the secure communication channel can therefore be effective isolated from the wider internet 132. In other embodiments the secure communication channel may be implemented using a server 102 located within a cloud computing service (e.g. Microsoft Azure Servers™). This cloud server may be accessible over the internet. Encrypted signalling messages can be sent over the internet to the cloud server (e.g. via its IP Address). The cloud server can then re-direct data to the intended recipient/device, thereby effectively providing the secure communication channel.

Applications executed by the first device 110, the second device 120 and the server 102 can facilitate secure communication/data transfer, including video calls, between the first and second devices in the system 100 via the secure communication channel 130. The secure communication channel can be accessed by any device which has been configured to do so by an operator/controller user of the system 100, regardless of their connection to any other network, if any. Whenever a device has its application open, it will be connected to server via the secure communication channel. Once connected, any data sent via the secure communication channel, and through the internet in some cases, is intended to be secure and safe from being intercepted. All data/content, as well as signalling messages related to setting up a secure connection in the secure communication channel, will travel via the channel to the server, where it will be redirected to the destination device. Audio/video calls can take place via this secure communication channel in some embodiments.

In some embodiments WebRTC is used to produce the applications, although it will be understood that alternative packages can be used. WebRTC comprises a set of open source APIs that give developers the ability to create real time video calls peer-to-peer. The APIs can allow developers to gain control of a device's media capabilities (e.g. microphone and/or webcam). WebRTC also allows a user to specify the video format and quality to ensure any video latency is low. To the inventor's knowledge WebRTC has not previously been used in combination with a secure network connection/channel.

Figure 2:
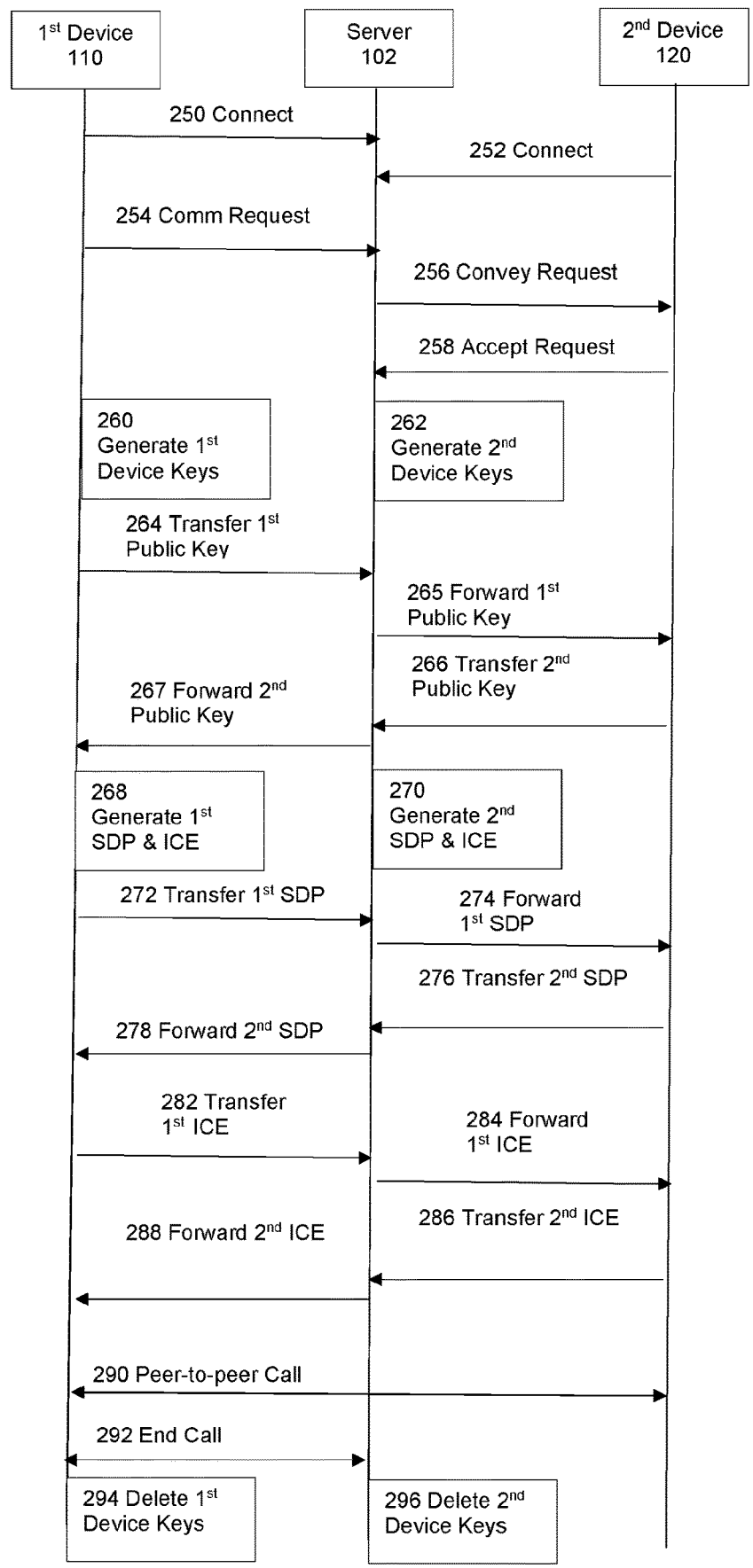
FIG. 2 is a diagram schematically illustrating operation of the example system.

FIG. 2 schematically illustrates an example of operation of the system 100. In the example the first device 110 comprises a set of Virtual/Augmented Reality goggles and the second device 120 may comprise a PC or the like. In the example scenario, the user of the first device is a maintainer user looking to obtain advice from a subject matter expert who is a user of the second device. Advantageously, the data exchange between the two users can take the form of a video call so that the subject matter expert user can provide substantially real-time visual assistance. For instance, images captured using a camera associated with the expert's PC 120 can be displayed on the maintainer's goggles 110, possibly superimposed or displayed in a semi-transparent manner on the maintainer's view of his surroundings. This can help demonstrate how to manipulate a piece of equipment that the maintainer is located next to and/or provide onscreen textual/graphical information, etc. However, it should be understood that the types of use, users and devices can vary. Alternative embodiments may transfer audio data and/or other data, such as instant messages. It will also be understood that in alternative embodiments more than two devices can communicate with each other in a real-time/simultaneous manner using the data transfer system.

At steps 250, 252 the applications running on the first 110 and the second 120 devices connect to the server 102 via the secure communication channel 130. This can involve any suitable processing steps, communications standards or protocols, and so on, as determined when the applications are created or configured. To start the video call the maintainer user of the first device can select a Subject Matter Expert user whose device (e.g. the second device 120) is currently connected to the server 102. The server may make information (e.g. details of the user/subject matter) regarding the devices/users that are connected to it available over the secure communication channel. The server can inform applications being executed on each connected device which other devices are connected to, or disconnected from, the server.

Before any data transfer takes place, users can specify which video codecs and video quality, etc, they would like to use. At step 254, the first device 110 sends a request to communicate with the second device 120 to the server 102 via the secure communication channel 130. At step 256 the server conveys the request to the second device and its user can then indicate to the sever and first device that it accepts the call at step 258. Before the peer-to-peer communication/video call can take place, each instance of the application running on the first 110 and the second 120 device may perform the steps described below.

For each connection/call that is set up, the instances of the applications running on the first 110 and the second 120 devices will each create a private and public key. Thus, at step 260 the first device generates a private key and public key, and at step 262 the second device 120 also generates its own private and public keys. A private key will not normally be shared with any person or device other than the device that created it; however, the public keys will be exchanged between the devices. By means of the combination of the device's own private key and the other device's public key at least the signalling messages used to set up a peer-to-peer connection between the devices can be encrypted and decrypted. The public keys can be exchanged using the secure communication channel 130 for security; however, even if an attacker was somehow able to get hold of a public key, they would still be unable to decrypt messages because they also need the corresponding private key. A message that a sender encrypts using the recipient's public key can be decrypted only by the recipient's paired private key. Whenever a new call is to take place, the private and public keys can be reset. Thus, keys are generated and destroyed on a per communication session/call basis.

At step 264 the first device 110 transfers data representing its public key via the secure communication channel 130 to the server 102, which then forwards it to the second device 120 via the secure communication channel at step 265. Similarly, at step 266 the second device provides data representing its public key to the server via the secure communication channel 130, which then forwards it to the first device via the secure communication channel at step 267. The exchange of the keys can allow data transfer in the system 100 to feature end-to-end encryption. Thus, before any signalling message is sent to the other device it can be encrypted.

In some embodiments there can also be an option to include an additional password/security code which will be included in at least the encryption key exchange process. Preferably, the password will not be exchanged via any signalling method over the secure communication channel or any other communications network connection between the two devices, but, instead, it may only be known by the users of the devices by prior personal arrangement or the like. In some embodiments the additional protection may comprise adding a security/verification code, e.g. a byte (a few digits), to the beginning and/or the end of a secret agreement/message that is used for generating the public keys. All or some data transferred between the devices will then only be able to be encrypted/decrypted if they include these extra digits. The digits could be a personal secret shared between the users of the two devices.

Following the key exchange the first 110 and the second 120 devices can exchange, via the secure communication channel 130 and the server 102, information useable to create a peer-to-peer data transfer connection between the two devices. This can involve one or more messages being exchanged between the devices that are encrypted using the keys generated and exchanged in the previous steps. In some embodiments, before the peer-to-peer data transfer can take place, both of the devices must exchange their own SDPs (Session Description Protocol; standard available at https://tools.ietf.org/html/rfc4566), as well as ICE (Interactive Connectivity Establishment; standard available at https://tools.ietf.org/html/rfc5245) candidates. SDPs contain information on what media capabilities each device has, and what video/audio codecs they will use for the video call. The ICE candidates describe how the peer-to-peer connection will take place, including IP addresses and ports at which the device can be accessed. In alternative embodiments different connection information can be generated and exchanged; for example, different video call connection information, or connection information required for exchanging audio or other (e.g. text/image) data.

At steps 268, 270 the first 110 and the second 120 devices each generate the respective SDP and ICE information. The SDP and exchange ICE candidate data then can be encrypted using the keys previously generated and exchanged. In order to exchange SDPs and ICE candidates, the application executed on the server 102 can function as a Signalling Server. The main purpose of this is to pass along signalling messages useable to set up the peer-to-peer connection/channel to the intended recipients. Both the SDPs and ICE candidates contain sensitive information, including the IP address of the devices making the call. If any of these signalling messages were intercepted by a third party then they could potentially re-route the call to themselves, or stop the call from taking place altogether. In order to overcome these issues, embodiments can use the signalling server located within the secure communication channel, with any/all signalling messages being encrypted end-to-end.

Thus, at step 272 the first device 110 transfers encrypted data representing its SDP information via the secure communication channel 130 to the server 102, which then forwards it to the second device 120 via the secure communication channel at step 274. At step 276 the second device provides transfers encrypted data representing its SDP information the server via the secure communication channel, which then forwards it to the first device via the secure communication channel at step 278 Following this, at step 282 the first device 110 transfers encrypted data representing its ICE information via the secure communication channel 130 to the server 102, which then forwards it to the second device 120 via the secure communication channel at step 284. At step 286 the second device provides transfers encrypted data representing its ICE information the server via the secure communication channel, which then forwards it to the first device via the secure communication channel at step 288.

At step 290, after the ICE Candidates have been exchanged, the peer-to-peer video call can begin. Users of the devices 110, 120 are able to converse with one another with low latency. When the call is ended (step 292) by one of the users, the private and public keys for that session can be deleted by each of the devices (steps 294, 296), or, alternatively, this could be done under the control of the server 102.

In summary, embodiments can provide a secure communication capability, including video calling, that can ensure the security of sensitive information. Embodiments are considered particularly secure because they involve multiple/chained security features, including the use of encryption keys, the secure communication channel and additional security codes.

It will be understood that embodiments can be implemented using any suitable software, programming language, data editors, etc, and may be represented/stored/processed using any suitable data structures. In alternative embodiments, at least some of the devices can be based on analogue computing elements. It will also be understood that the steps described herein as part of the detailed embodiments may be re-ordered, omitted and/or repeated. Additional steps may also be performed. Some steps may be performed concurrently instead of sequentially. Further, different components may perform some of the steps. For instance, the encryption keys for at least one of the devices may be generated by another device, e.g. the server, that may then transfer the public and private keys to the first device and/or transfer the public key to the other device.

Attention is directed to any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computer-implemented method of providing secure communication between a first device and a second device, the method comprising:
   the first device and the second device connecting to a server via a secure communication channel;
   generating encryption keys for the first device;
   generating encryption keys for the second device;
   transferring data relating to the encryption keys for the first device to the second device via the server in the secure communication channel;
   transferring data relating to the encryption keys for the second device to the first device via the server in the secure communication channel;
   generating peer-to-peer connection information for the first device and encrypting the peer-to-peer connection information for the first device using the data relating to the encryption keys for the second device;

generating peer-to-peer connection information for the second device and encrypting the peer-to-peer connection information for the second device using the data relating to the encryption keys for the first device;

transferring the encrypted peer-to-peer connection information for the first device to the second device via the server in the secure communication channel;

transferring the encrypted peer-to-peer connection information for the second device to the first device via the server in the secure communication channel;

the first device decrypting the encrypted peer-to-peer connection information for the second device;

the second device decrypting the encrypted peer-to-peer connection information for the first device;

the first device and the second device using the decrypted peer-to-peer connection information for the first device and the decrypted peer-to-peer connection information for the second device to open a peer-to-peer connection in the secure communication channel;

the first device and the second device exchanging data via the peer-to-peer connection;

the first or the second device including a security code in data transferred to the second or the first device, respectively; and the first or the second device checking for inclusion of the security code in the transferred data and only performing further steps on the data if the security code is included in the data, wherein the security code is provided to the first device or the second device prior to the first device and second device connecting to the server via the secure communication channel.

2. The method according to claim 1, wherein the security code is included in the data relating to the encryption keys for the first and the second device, the security code is included in the encrypted peer-to-peer connection information for the first or second device, and the security code is included in the data exchanged with the first or second device via the peer-to-peer connection.

3. The method according to claim 2, wherein the first or the second device is configured to add the security code to a beginning and an end of the data.

4. The method according to claim 2, wherein the first or the second device is configured to add the security code to a beginning or an end of the data.

5. The method according to claim 1, further comprising:
deleting the encryption keys for the first device and the encryption keys for the second device after the exchanging of data has ended.

6. The method according to claim 1, wherein the encryption keys for each of the first device and the second device comprise a public key and a private key, and wherein the transferred data relating to the encryption keys for the first and the second device each comprise the public key for the first or second device, respectively.

7. The method according to claim 1, wherein the peer connection information for the first and the second device comprises Session Description Protocol, SDP, information and Interactive Connectivity Establishment, ICE, information.

8. The method according to claim 1, further comprising:
the server notifying, via the secure communication channel, the second device of the first device requesting to communicate with the second device, and the server notifying the first device of acceptance of the communication request by the second device via the secure communication channel.

9. The method according to claim 1, wherein the secure communication channel is implemented using high threat gateway hardware or a cloud computing service.

10. The method according to claim 1, wherein the exchanged data comprises audio and video data.

11. The method according to claim 1, further comprising:
deleting the encryption keys for the first device or the encryption keys for the second device after the exchanging of data has ended.

12. The method according to claim 1, wherein the exchanged data comprises audio or video data.

13. A method for a first device to perform secure communication with a second device, the method comprising:
connecting to a server via a secure communication channel;

generating encryption keys for the first device;

transferring data relating to the encryption keys for the first device to the second device via the server in the secure communication channel;

receiving data relating to encryption keys for the second device via the server in the secure communication channel;

generating peer-to-peer connection information for the first device and encrypting the peer-to-peer connection information for the first device using the data relating to the encryption keys for the second device;

transferring the encrypted peer-to-peer connection information for the first device to the second device via the server in the secure communication channel;

receiving encrypted peer-to-peer connection information for the second device via the server in the secure communication channel;

decrypting the encrypted peer-to-peer connection information for the second device using the encryption keys for the first device;

using the peer-to-peer connection information for the first device and the decrypted peer-to-peer connection information for the second device to open a peer-to-peer connection in the secure communication channel;

exchanging data with second device via the peer-to-peer connection;

the first or the second device including a security code in data transferred to the second or the first device, respectively; and the first or the second device checking for inclusion of the security code in the transferred data and only performing further steps on the data if the security code is included in the data, wherein the security code is provided to the first device or the second device prior to the first device and second device connecting to the server via the secure communication channel.

14. A method for a server to allow a first device and a second device to perform secure communication, the method comprising:
connecting to the first device via a secure communication channel;

connecting to the second device via the secure communication channel;

receiving data relating to encryption keys for the first device via the secure communication channel;

receiving data relating to encryption keys for the second device via the secure communication channel;

transferring the data relating to encryption keys for the first device to the second device via the secure communication channel;

transferring the data relating to encryption keys for the second device to the first device via the secure communication channel;

receiving encrypted peer-to-peer connection information for the first device and transferring the encrypted peer-to-peer connection information for the first device via the secure communication channel to the second device;

receiving encrypted peer-to-peer connection information for the second device and transferring the encrypted peer-to-peer connection information for the second device via the secure communication channel to the first device;

the first or the second device including a security code in data transferred to the second or the first device, respectively; and the first or the second device checking for inclusion of the security code in the transferred data and only performing further steps on the data if the security code is included in the data, wherein the security code is provided to the first device or the second device prior to the steps of connecting to the first device or the second device via the secure communication channel.

15. A non-transitory computer-readable storage medium comprising instructions which, when executed by a computer, cause the computer to perform at least a method according to claim 1.

16. A first computing device comprising a processor configured to perform a method of performing secure communication with a second device according to claim 13.

17. A transfer server comprising a processor configured to perform a method of allowing a first device and a second device to perform secure communication according to claim 14.

* * * * *